Feb. 25, 1941.  R. L. WILSON  2,232,750
BRAKING
Filed July 24, 1939  5 Sheets-Sheet 1

Inventor,
Rosser L. Wilson
By Bell, Wallon and Cannon
Attorneys

Feb. 25, 1941.  R. L. WILSON  2,232,750
BRAKING
Filed July 24, 1939   5 Sheets-Sheet 2
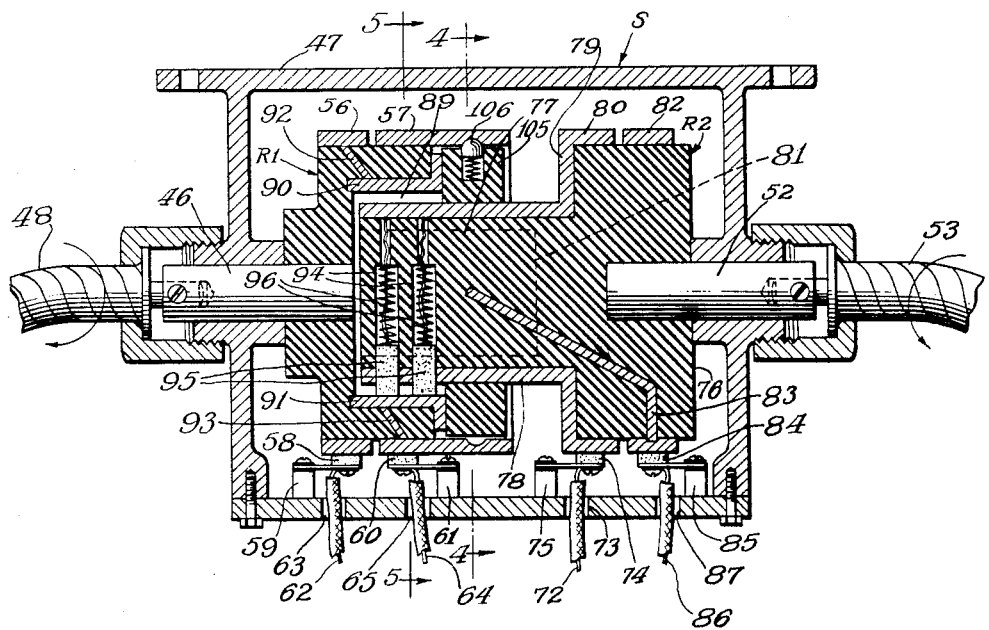
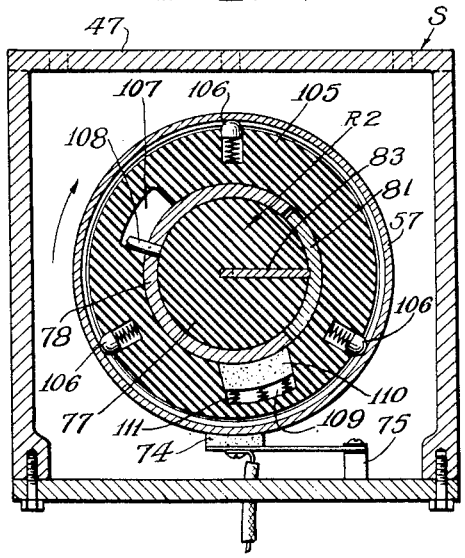
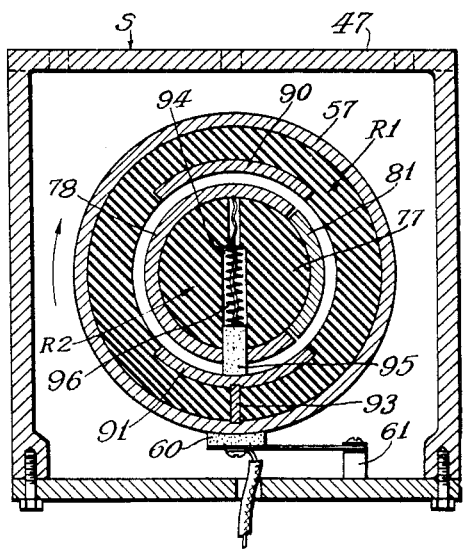
Inventor:
Rosser L. Wilson
By Bell, Wallace and Cannon
Attorneys

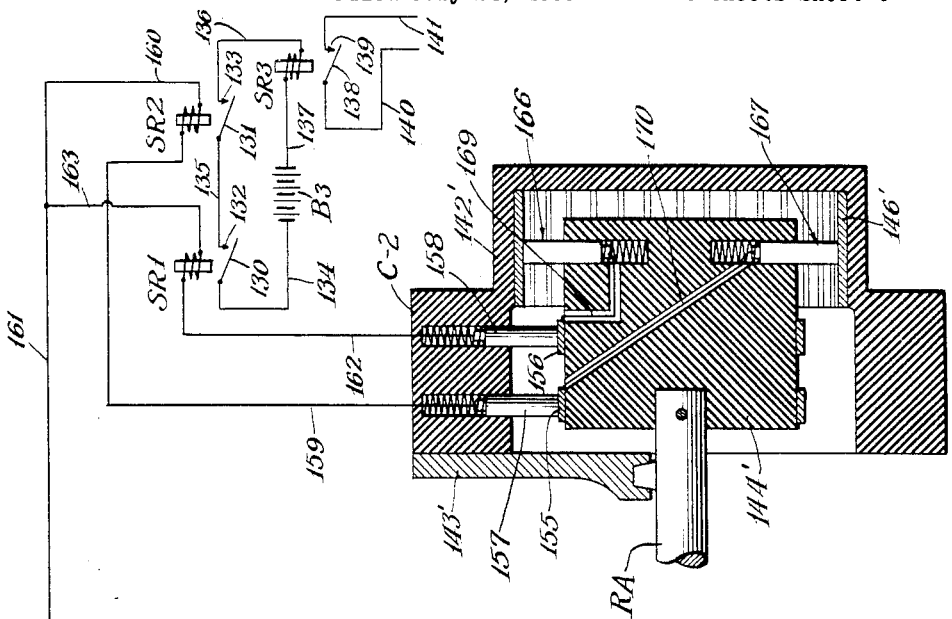
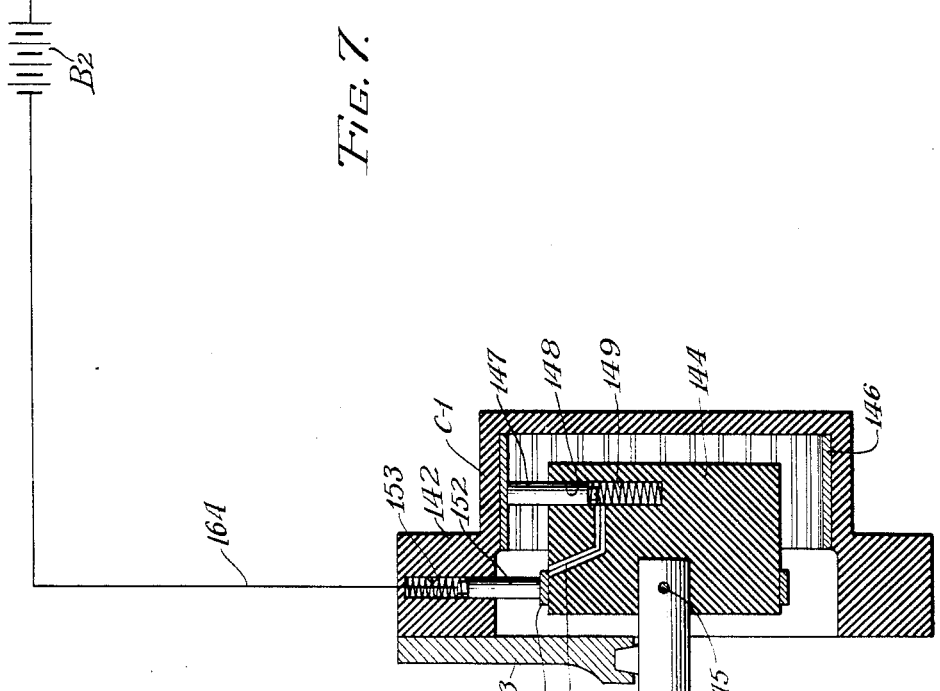

Feb. 25, 1941.  R. L. WILSON  2,232,750
BRAKING
Filed July 24, 1939   5 Sheets-Sheet 5

Inventor:
Rosser L. Wilson
By Bell, Wallace and Cannon
Attorneys

Patented Feb. 25, 1941

2,232,750

UNITED STATES PATENT OFFICE 2,232,750

BRAKING

Rosser L. Wilson, Mahwah, N. J., assignor to The American Brake Shoe and Foundry Company, New York, N. Y., a corporation of Delaware Application July 24, 1939, Serial No. 286,047

24 Claims. (Cl. 188—181)

This invention relates to braking and especially, though not necessarily, to the braking of railway and like equipment and particularly pertains to modifications of the invention disclosed in my co-pending application Serial No. 213,103, filed June 10, 1938.

As explained in my aforesaid co-pending application, in the normal operation of railway equipment it is believed that there is no appreciable slippage at the points of contact of the wheels of the equipment with the rails and that the wheels roll along the rails. During a braking operation on such equipment the retarding forces effective on the wheels react at the rails to slow down the rolling movement of the wheels and so long as the adhesion between each wheel and the rail on which it rolls exceeds the retarding force effective on the wheel, the wheel is retarded without apprecibale slippage at the contact thereof with the rail. It has been observed however where the retarding force effective on a wheel in a braking operation exceeds the force of adhesion between such wheel and the rail on which it rolls that the wheel appreciably slips on the rail and is thereafter retarded at a rate exceeding that at which it would have been retarded had not the slippage occurred and as a result of such increase in the rate of retardation the wheel comes to rest prematurely and thereafter slides along the rail.

There are many factors which may cause the retarding force effective on a wheel in a braking operation to exceed the adhesion between such wheel and the rail on which it rolls. For example, the braking means of railway equipment is so arranged that the friction between the elements thereof is less than what has come to be generally accepted as the value of the adhesion between a wheel decelerated by operation of such braking means and the rail on which such wheel rolls. There may be however an unpredictable increase in the friction between the elements of the braking means, or the friction between the wheel and the rail may unaccountably drop below what has come to be generally accepted as the value of such friction, and of course there may be a combination of such variations in friction. If such variation occurs in a braking operation it is quite likely that the wheel affected thereby will slip on, rather than roll on, the rail whereupon as previously explained the wheel may prematurely stop rolling and thereafter slide along the rail. Such sliding of the wheel along the rail may impair the braking operation in which it occurs and may result in serious damage such as producing a so-called flat on the wheel. It will be understood that wheel sliding may be occasioned in a wide variety of ways but that however occasioned it is always objectionable.

It has been observed in braking operations on railway equipment that, when a wheel appreciably slips on the rail on which it normally rolls and prematurely stops rolling and thereupon slides along the rail, the wheel, in so far as its rotative movement is concerned, slows down rapidly after slippage occurs and quickly stops rolling to thereupon start to slide and also that where several wheels substantially simultaneously or simultaneously slip on the rail or rails on which they normally roll the wheels usually slow down rapidly, in so far as the rotative movement thereof is concerned, at different rates and consequently stop rolling and start to slide at different times. Such lack of uniformity in slowing down is probably due to variations in the conditions at the various wheels. Such variations may be due to differences in the loads on the various wheels, differences in retarding forces affecting the respective wheels, or the like. In any event however where several wheels slip on the rail or rails, a variation in the rates of rotation of the various wheels usually arises before any wheel prematurely stops rolling and starts to slide along the rail. The present invention is predicated upon this observation, which is to say, the fact that there is an appreciable variation in the rates of rotation of the wheels prior to the time they prematurely stop rolling and start to slide along the rails is utilized in the present invention.

It is recognized that the rates of rotation of the various wheels on a railway car or the like may not always be the same. For example, there may be a difference in the diameters of such wheels at the lines of contact thereof with the rail or rails which will of course cause the wheels to rotate at different rates in normal operation as well as during a braking operation. Thus, if resort is had to an arrangement wherein elements are rotated at rates proportionate to the rates of rotation of different wheels on railway equipment, such elements may not always operate at the same rate either in normal operation or during a braking operation and if such elements are employed to detect a tendency toward sliding in the course of a brake operation, which as explained above will be indicated by an appreciable difference in the rates of rotation of different wheels, provision must be made whereby cognizance will not be taken of such differences in the rates of rotation of different wheels that may arise in conditions other than the initiation of wheel sliding. This is particularly true if a control operation affecting the braking operation, such as increasing the friction between the wheel and the rail by supplying sand to the rail ahead of the wheel or releasing the braking means or effecting other reduction in the effectiveness of such means, is to be brought about when a wheel sliding condition, or a tendency toward such a condition, is detected in the course of a braking operation. It will of course be understood if the friction between a wheel that starts to appreciably slip in the course of a braking operation and the rail on which such wheel normally rolls is materially increased or if the braking means effective to retard such a wheel in a braking operation is released or otherwise reduced in effectiveness, that wheel sliding may be avoided for the effect in such instances will be to bring about a condition wherein the adhesion between the wheel and the rail will exceed the retarding force effective on the wheel and thus the condition which permits wheel sliding is eliminated.

In view of the fact however that elements each operated at a rate proportionate to the rate of rotation of a wheel on railway equipment may operate at different rates in conditions other than those which arise at the initiation of and during a wheel sliding condition, it is desirable to arrange the means which will initiate a control operation under control of such elements in such a way that the control operation will be initiated only when the elements operate in differences in rates predetermined to be indicative of abnormal conditions such as are present during the initiation of and in the course of a wheel sliding condition. This desirable end may be accurately accomplished by employing means entailing a time factor in its operation to detect a wheel sliding condition or other abnormal difference in the rates of operation of different elements or units.

If a control operation that is to affect a braking operation on railway equipment is initiated upon a predetermined difference in the rates of rotation of different wheels of the equipment, it will either be necessary to render such operation effective on the braking operations on both of such wheels or else to determine which of such wheels is rotating the more slowly and to affect only the braking operation on such wheel or wheels. It will be recognized that it will be desirable to affect the operation of the braking means as little as possible during the course of a braking operation so that maximum efficiency of the braking means may be realized and it will be seen that this can best be effected by only affecting the braking operation or operations on the wheel or wheels that are most rapidly abnormally slowing down in the course of the deceleration of the equipment and so to do is an important object of the present invention, or more broadly stated, it is an object of this invention to detect an abnormal difference in the rates of operation of two or more elements or units and to thereupon initiate a control operation that will affect only the element or unit or elements or units operating in such a way as to bring about such abnormal difference in the rates of operation.

While a substantial part of railway and like equipment is capable of being operated with either end thereof faced forwardly, there is also equipment which in service is normally operated with a particular end thereof faced forwardly and some modern Diesel powered passenger trains are an example of such equipment. Now if resort is had to an arrangement wherein elements are rotated at rates proportionate to the rates of rotation of different wheels on railway equipment and it is desired to bring about a control operation that will affect a braking operation only on the wheel or wheels that abnormally slows down or slow down more rapidly than another wheel, to which wheels the aforesaid elements are respectively associated, it will, by reason of the mechanical exigencies entailed, normally be necessary to rotate the elements in a given direction to bring about a particular control operation. This may be easily accomplished on railway and like equipment that is operated in service with a particular end thereof faced forwardly, and which will be referred to hereinafter as being operated in service in but a single direction, and thus another object of the present invention is to rotate elements at rates proportionate to the rates of rotation of selected wheels on railway equipment that is operated in service in but a single direction and to associate with such elements an arrangement which will indicate which of the wheels with which such elements are associated is abnormally slowing down in the course of a braking operation to thereby enable a control operation to be brought about and a related object is to enable such an arrangement to be utilized on railway equipment that may be operated in service in either direction.

Further objects of this invention are to rotate elements at rates proportionate to the rates of rotation of different wheels on railway equipment and to so arrange such elements that, when an abnormal difference in the rates of rotation therebetween arises in the course of a braking operation, a control operation may be brought about which will affect the braking operation; to so arrange such elements that an electric circuit will be closed when there is an abnormal difference in the rates of rotation of such elements; to enable relative movement to be effected between certain parts of such elements when a difference in the rates of rotation thereof arises in such a way that a selected control operation will be brought about as determined by the relative movement or the lack of relative movement between such parts of said elements, such control operation for example being such as to increase the adhesion between a wheel or wheels and the rail or rails on which such wheel or wheels normally rolls or roll or the release of the braking means effective on the particular wheel or wheels associated with the element that is rotating at the slowest rate when such relative movement or lack of it occurs in the course of an abnormal difference in the rates of rotation of said elements or other reduction in the effectiveness of such braking means; to utilize such relative movement between parts of the elements or the lack of such relative movement to establish selected of electric circuits that are closed upon an abnormal difference in the rates of rotation between said elements; to close an electric circuit only when an abnormal difference arises in the rates of rotation of elements as aforesaid; and to selectively establish such circuit to bring about a control operation that will be effective only on means affecting the element that is rotating more slowly than another of such elements.

In those instances where elements rotated at rates proportionate to the rates of rotation of different wheels of railway equipment are provided on equipment that may be operated in service in either direction and an abnormal difference in the rates of rotation of such elements arises and such a condition is to bring about a control operation, it is still another object of this invention to render said control operation effective in one manner when the equipment is operating in one direction and in another manner when the equipment is operating in the other direction and an object ancillary to the foregoing is to establish, under predetermined circumstances, a particular electric circuit when the equipment is operating in one direction and still another electric circuit when the equipment is operating in the other direction.

More specifically, an object of this invention is to bring about successive or alternate periods of operation of slow-to-release relays and when the intervals between such periods of operation are reduced in a predetermined amount to effect simultaneous instead of alternate operation and to thereupon effect a control operation; to bring about such a control operation by establishing an electric circuit; to include alternative paths in such a circuit; and to selectively establish circuit through said alternative paths under control of operating characteristics of means to be affected by the control operation and an object ancillary to the immediately preceding object is to include other alternative circuits in the arrangement and to selectively establish circuit through said alternative circuits under control of a further operating characteristic of the means to be affected by the control operation.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 3 is a vertical longitudinal sectional view through a switch employed in my novel apparatus;

Figure 6:
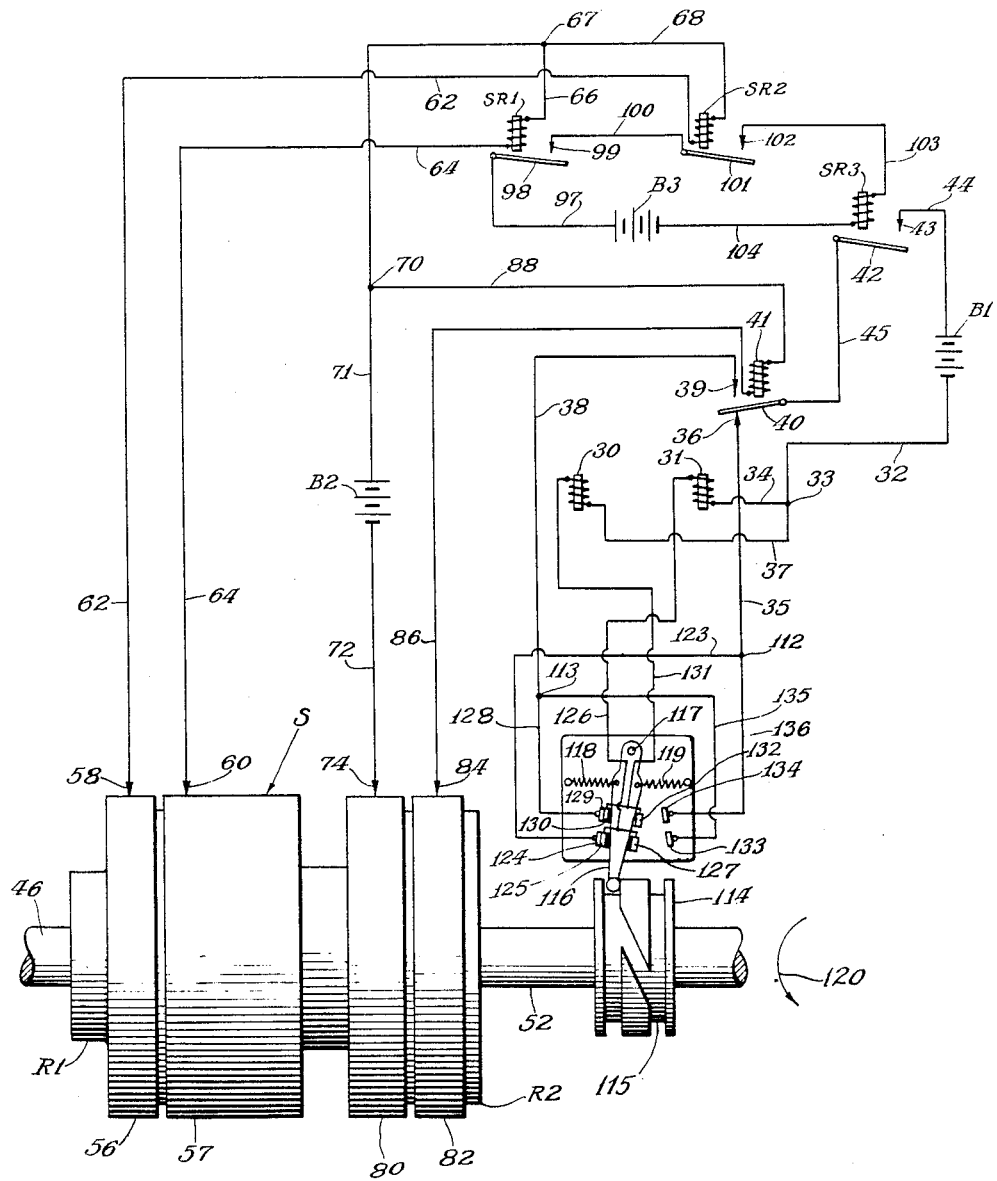
Figure 8:
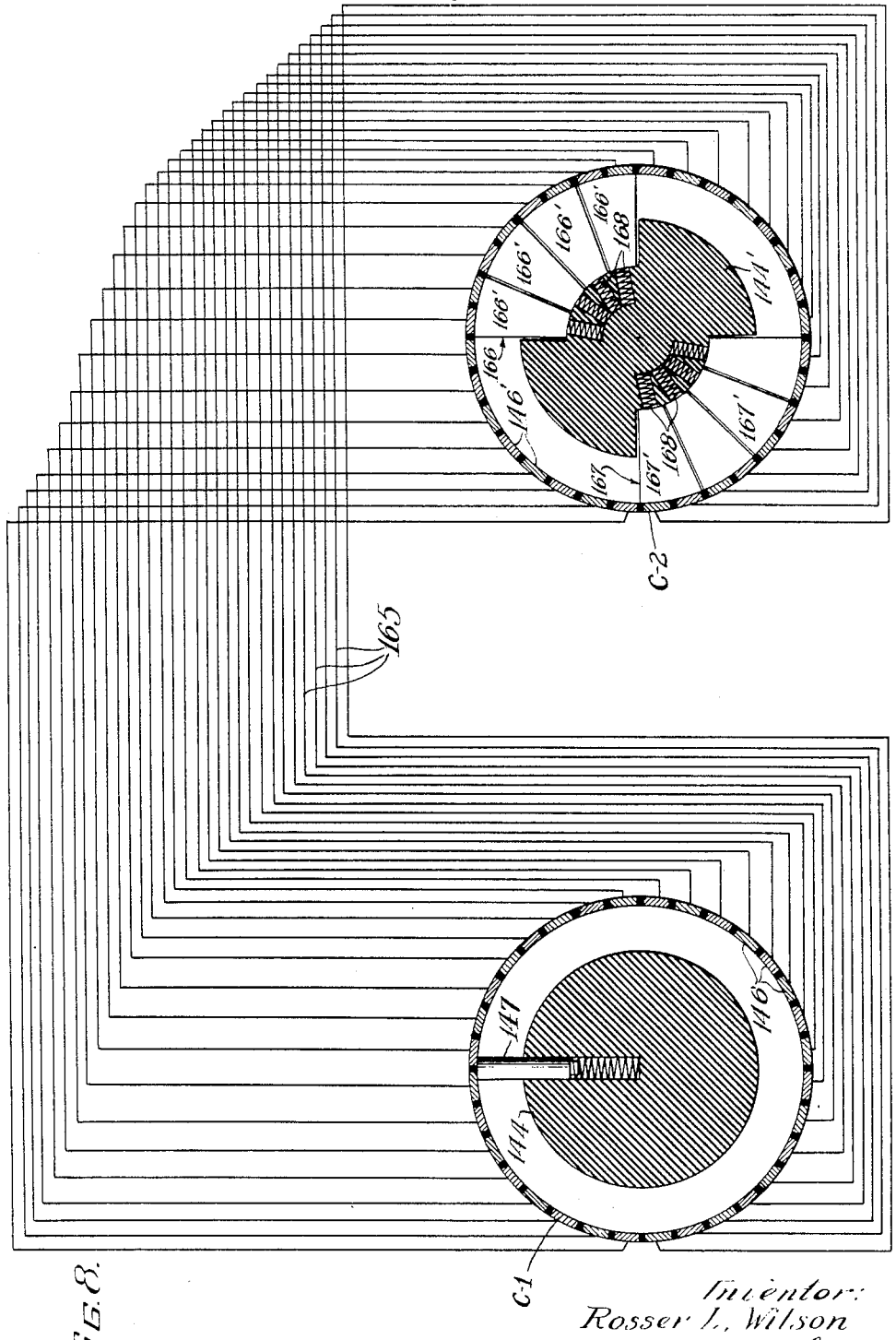

Figs. 4 and 5 are transverse sectional views taken respectively on the lines 4—4 and 5—5 on Fig. 3;

Fig. 6 is a wiring diagram of another form of my invention and in which certain parts of a switch such as that shown in Fig. 3 appear in elevation;

Fig. 7 is a diagrammatic view illustrating another form of my invention wherein the moving parts of the rotation comparing switch means are mounted remotely from each other; and Fig. 8 is a wiring diagram illustrating certain of the electrical connections employed in the embodiment of Fig. 7.

The embodiment of the invention illustrated in Figs. 1 to 5 is particularly adapted for use on railway equipment that is operated in but a single direction when in service, an example of which equipment are some modern Diesel powered passenger trains although it is to be understood that my invention is not necessarily limited to use on such type trains for it is equally adaptable for use on street cars and interurban and like railway equipment that are customarily operated in but a single direction when in service. It will be understood that when reference is made to equipment which is operated in but a single direction when in service that reference is made to equipment which may nevertheless be operated in the opposite direction but under such conditions the equipment will usually be operated in one direction at relatively low speeds wherefore the likelihood of wheel sliding arising is quite remote and that therefore the utilization of an arrangement such as shown in Fig. 6 and which is described hereinafter is not necessary on equipment of this type.

Figure 1:
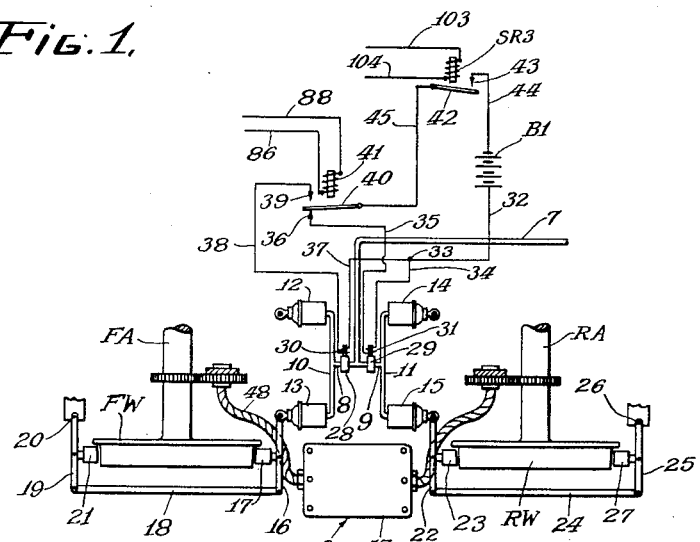
Fig. 1 is a fragmentary plan diagrammatic view of a form of my invention particularly adapted for use on railway and like equipment operated in service in but a single direction.

In the embodiment of my invention shown in Fig. 1 I have diagrammatically illustrated a braking means which is particularly adaptable for use with wheels secured at opposite ends of an axle, a particular braking means being provided for the wheels mounted on a particular axle. Such an arrangement of the wheels is common in railway equipment and for this reason has been illustrated but, as will appear presently, my invention is equally applicable for use with a braking means that would be operative to effect retardation of but a single wheel and likewise for use with braking means operative to effect retardation of more than two wheels.

The particular braking means which is diagrammatically illustrated in Fig. 1 is of course exemplary of a wide variety of braking means that might be provided. Such braking means are customarily operated by fluid pressure and in the present instance a supply pipe 7 is provided which leads from a suitable control valve that regulates the admission of a fluid, as air, under pressure into the pipe 7. The pipe 7 in the present instance terminates in branches 8 and 9 which respectively lead to distributing pipes 10 and 11 and through which air under pressure is respectively supplied to the brake cylinders 12 and 13 and 14 and 15 when air under pressure is admitted into the pipe 7. The admission of air under pressure to the brake cylinder 13 in the embodiment of my invention illustrated in Fig. 1 moves the brake arm 16 in such a direction that the brake shoe 17 carried by this arm is applied against the periphery of the front wheel FW that is fast to the front axle FA which as is understood in the art is journaled in suitable bearings provided on a truck through which the axle and the wheels secured thereto are connected to the particular piece of equipment of which such apparatus is a part. The aforesaid movement imparted to the brake arm 16 is transmitted through the link 18 to the brake arm 19 that is fulcrumed as indicated at 20 and which carries an brake shoe 21, and the movement thus imparted to the brake arm 19 causes the shoe 21 to be applied to the periphery of the wheel FW.

Likewise, the admission of air into the brake cylinder 15 moves the brake arm 22 in such a direction that the brake shoe 23 is applied to the periphery of the rear wheel RW that is secured to one end of the rear axle RA and such movement of the brake arm 22 is transmitted through the link 24 to the brake arm 25 that is fulcrumed as indicated at 26 whereby the brake shoe 27 carried by the brake arm 25 is also applied to the periphery of the rear wheel RW.

It will be understood that wheels similar to the wheels FW and RW are respectively secured to the opposite ends of the axles FA and RA and that when air under pressure is admitted into the brake cylinders 12 and 14 brake shoes corresponding to the brake shoes 17 and 21 and 23 and 27 are respectively applied to such other wheels.

A valve 28 is provided in the branch pipe 8 and another valve 29 is provided in the branch pipe 9. The illustrated valves are vent-check valves of the solenoid-operated type, the valve 28 including a solenoid 30 and the valve 29 including a solenoid 31. The valves 28 and 29 are normally open to the brake cylinders 12, 13, 14 and 15 and closed to atmosphere, but upon energization of the solenoids thereof these valves in the present instance are arranged to shut off flow through the branch pipes 8 and 9 respectively, and vent the brake cylinders to atmosphere, thereby relieving the brake pressure exerted upon the corresponding brake shoes.

In accordance with this invention the solenoid 30 is adapted to be energized when the front wheel FW slows down at an abnormal rate in the course of a braking operation, and it will be understood that in the present instance the other wheel on the axle FA will also be so slowed down. However, for the sake of convenience, hereinafter reference will be made only to the wheels FW and RW inasmuch as such reference will be sufficient to explain the present invention. Likewise, when the wheel RW slows down at an abnormal rate in the course of a braking operation, the solenoid 31 is adapted to be energized.

Figure 2:
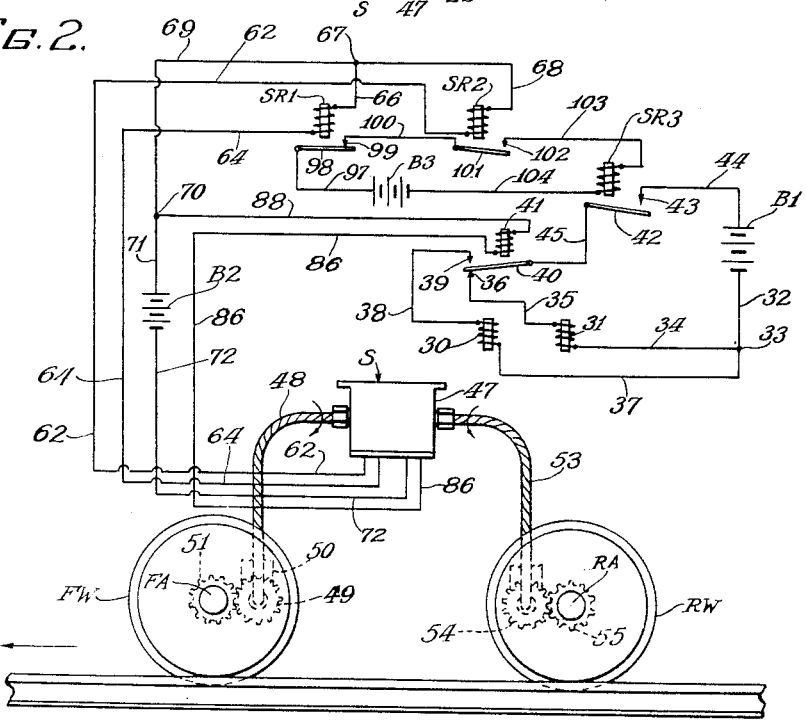
Fig. 2 is a schematic view in which certain of the mechanical elements shown in Fig. 1 are illustrated in side elevation.

By referring to Fig. 2 it will be seen that in the present instance a source of current B1 is provided and that a conductor 32 leads therefrom to a terminal 33. A conductor 34 leads from the terminal 33 to one end of the winding of the solenoid 31 and another conductor 35 leads from the other end of the winding of the solenoid to a contact 36. Furthermore, a conductor 37 leads from the terminal 33 to one end of the winding of the solenoid 30 and a conductor 38 leads from the other end of the winding of the solenoid 30 to a contact 39.

In the present instance the contacts 36 and 39 are alternately engageable by the armature 40 of a relay 41, the arrangement being such that so long as the relay 41 is deenergized the armature 40 remains in engagement with the contact 36 but upon energization of the relay 41 the armature 40 is attracted into engagement with the contact 39. Therefore the armature 40 is operative to selectively establish circuit either to the solenoid 31 or the solenoid 30 and circuit is closed to one or the other of these solenoids whenever the armature 42 of the slow-to-release relay SR3 is attracted into engagement with the contact 43 which is brought about by energization of the relay SR3, circuit in such an instance being from the battery B1 through conductor 44, contact 43, armature 42, conductor 45 to armature 40 and thence either through contact 36, conductor 35, the winding of solenoid 31 and conductors 34 and 32 to the battery B1 or through contact 39, conductor 38, the winding of solenoid 30 and conductors 37 and 32 to the battery B1. From the foregoing it will be seen that in order for either the solenoid 30 or the solenoid 31 to be energized it is necessary that the slow-to-release relay SR3 be energized and, this relay is part of an arrangement which is operative to determine whether one or the other of the wheels FW or RW is slowing down abnormally in the course of a braking operation.

The arrangement of which the slow-to-release relay SR3 is a part includes a switch S having rotors R1 and R2, Figs. 2 and 3, therein which constitute elements adapted to be rotated at rates proportionate to the rate of rotation of the wheels FW and RW respectively.

To this end the rotor R1 is fast to a shaft 46, Fig. 3, that is suitably journaled in a bearing provided in the housing 47 of the switch S. A flexible shaft 48 is connected to the shaft 46 and leads to a pinion 49 which along with this end of the flexible shaft 48 is supported by a bracket 50 carried by the truck in which the axle FA is journaled. The pinion 49 in the present instance meshes with a pinion 51 that is fast on the axle FA which rotates with the wheel FW. It is to be understood that the just described arrangement is but one of several to which resort might be had to connect the rotor R1 with the wheel FW so that this rotor can be operated at a rate proportionate to the rate of rotation of the wheel FW.

The rotor R2 is fast to a shaft 52 that is also journaled in a suitable bearing provided in the housing 47 and a flexible shaft 53 is connected to the shaft 52 and to a pinion 54 that meshes with a pinion 55 fast on the rear axle RA which pinions are arranged similarly to the pinions 49 and 51 and it will be understood that what has been said with respect to the connection of the rotor R1 to the front wheel FW applies with equal force with respect to the connection of the rotor R2 to the rear wheel RW.

A pair of conductor rings 56 and 57 is provided on the periphery of the rotor R1. A contact 58 is spring-urged into engagement with the periphery of the conductor ring 56 and is supported from a post 59 which in turn is connected to the housing 47, the contact 58 being suitably insulated from the housing 47. A contact 60 is spring-urged into engagement with the periphery of the conductor ring 57 and is carried by a post 61 that in turn is carried by the housing 47 and said contact 60 is likewise insulated from the housing 47.

A conductor 62 is connected to the contact 58 and is led from the housing 47 through an opening 63 therein. Another conductor 64 is connected to the contact 60 and is led from the housing 47 through an opening 65 therein.

By referring to Fig. 2 it will be seen that the conductor 64 leads to one end of the winding of a slow-to-release relay SR1 and that the conductor 62 leads to one end of the winding of a slow-to-release relay SR2.

A conductor 66 leads from the other end of the winding of the relay SR1 to a terminal 67 while a conductor 68 leads from the other end of the winding of the relay SR2 to said terminal 67. A conductor 69 leads from the terminal 67 to the terminal 70 and a conductor 71 leads from the terminal 70 to one terminal of the source of current as battery B2. A conductor 72 leads from the other terminal of the source of current as battery B2 through an opening 73 in the housing 47 to a contact 74 which is carried by a post 75 which in turn is carried by the housing 47, said contact 74 being insulated from said housing.

The rotor R2 includes an enlarged head portion 76 and a stem portion 77 both of which are circular in cross-section. A sleeve 78 of conductive material partially surrounds the stem portion 77 of the rotor R2, as best shown in Figs. 4 and 5, and terminates in a web 79 that lies against the shoulder defined at the juncture between the portions 76 and 77 of the rotor R2, which is of insulating material as is the rotor R1, and the web portion 79 in turn terminates in a continuous conductor ring 80 provided on the periphery of the head portion 76 of the rotor R2, the contact 74 bearing on the periphery of the conductor ring 80. A segment 81 of conductive material extends along the stem portion 77 but terminates in spaced relation with the web portion 79 and is spaced from the edges of the sleeve 78 so that the conductive segment 81 is electrically isolated from the sleeve 78. Another conductor ring 82 is provided on the periphery of the head portion 76 in spaced relation with the conductor ring 80 and a conductive web 83 embedded in the rotor R2 electrically connects the conductive segment 81 to the conductor ring 82. A contact 84 bears on the periphery of the conductor ring 82 and is carried by a post 85 that in turn is carried by the housing 47 and the contact 84 is insulated from said housing. A conductor 86 leads through an opening 87, Figs. 3 and 2, in the housing 47 to one end of the winding of the relay 41, a conductor 88 leading from the other end of the winding of this relay to the terminal 70.

By referring to Fig. 3 it will be seen that a cylindrical recess 89 is provided in the face of the rotor R1 that is disposed toward the rotor R2 and that the stem 77 projects into this recess. As best shown in Fig. 5, a conductive segment 90 is mounted in the rotor R1 in such position that a face of this segment lies in the periphery of the cylindrical wall of the recess 89 and still another conductive segment 91 is similarly mounted in the rotor R1 in diametrical relation with respect to the conductive segment 90. The conductive segment 90 is connected to the conductor ring 56 by a conductive web 92 that is embedded in the rotor R1 and the conductive segment 91 is connected to the conductor ring 57 by a conductive web 93 that is also embedded in the rotor R1.

In that part of the stem portion 77 and the sleeve 78 that project into the recess 89, a pair of recesses 94 is provided and contacts 95 are mounted in these recesses with springs 96 extended between the inner ends of these contacts and the inner ends of the recesses 94 whereby these contacts are urged toward the cylindrical wall of the recess 89. Hence, if there is relative movement between the rotors R1 and R2, the contacts 95 will alternatively engage the conductive segments 90 and 91 and when the contacts 95 (a pair of contacts being provided to insure better contact and it will be understood that but one contact could be used if so desired) engage the conductive segment 91, circuit is established from conductor 64 through contact 60, conductor ring 57, web 93, conductive segment 91, contacts 95, sleeve 78, web 79, conductor ring 80 and contact 74 to conductor 72 but when the contacts 95 engage the conductive segment 90 circuit is established from conductor 62 through contact 58, conductor ring 56, web 92, conductive segment 90, contacts 95, sleeve 78, web 79, conductor ring 80 and contact 74 to conductor 72.

By referring to Fig. 2 it will be seen that the conductor 72 leads from one terminal of the source of current B2 while the conductors 64 and 62 respectively lead to corresponding ends of the windings of the relays SR1 and SR2 and the other ends of these windings are connected to the other terminal of the source of current B2. This arrangement is utilized to detect an abnormal difference in the rates of rotation of the rotors R1 and R2 and therefore of the wheels FW and RW.

By referring to Fig. 2 it will be seen that a conductor 97 leads from one terminal of a source of current B3 to the armature 98 of the slow-to-release relay SR1 which armature is engageable with a contact 99 when said relay is operative. A conductor 100 leads from the contact 99 to the armature 101 of the slow-to-release relay SR2 which armature is engageable with the contact 102 when this relay is operative. A conductor 103 leads from contact 102 to one end of the winding of the relay SR3 while a conductor 104 leads from the other end of this winding to the other terminal of the source of current B3. Thus when both the slow-to-release relay SR1 and the slow-to-release relay SR2 are operative to have the armatures 98 and 101 thereof respectively engaged with the contacts 99 and 102, circuit is closed through the winding of the slow-to-release relay SR3 whereupon this relay is energized and this relay thereupon attracts its armature 42 into engagement with the contact 43 and thereupon circuit is closed to either the solenoid 30 or the solenoid 31 in the manner hereinabove explained which is determined by whether or not the relay 41 is energized.

Energization of the relay 41 is effected by closing circuit between the sleeve 78 and the conductive segment 81 and this is brought about in the following manner.

As best shown in Figs. 3 and 4, a ring 105 of insulating material is disposed about the sleeve 78 and the conductive segment 81 and this ring is retained in frictional engagement with the adjacent end of the rotor R1 by spring-pressed plungers 106 which extend into a groove formed in the inner periphery of that part of the conductor ring 57 that extends beyond the adjacent end of the rotor R1. A circumferentially extending recess 107, Fig. 4, is provided in the ring 105 and a pin 108 embedded in the sleeve 78 projects into this recess. Another recess 109 is provided in the ring 105 and a contact 110 is mounted therein and is urged against the periphery of the sleeve 78 by springs 111 arranged between the inner end of this contact and the inner edge of the recess 109.

The contact 110 and the sleeve 78 and conductive segment 81 constitute a switch for when the rotor R2 rotates more slowly than the rotor R1 then the contact 110 engages only the sleeve 78 but when the rotor R1 rotates more slowly than the rotor R2 then the contact 110 bridges the gap between the sleeve 78 and the segment 81 and closes a circuit to be explained presently. The reason for this is that the ring 105, which carries contact 110, tends to rotate with rotor R1 by reason of its aforesaid frictional engagement with this rotor. The pin 108 and the extent of the recess 107 limit the relative movement between contact 110 and sleeve 78 and conductive segment 81 and therefore the opening or closing of the switch afforded thereby.

In operation, in the form of my invention now being described, the rotors R1 and R2 rotate clockwise, as viewed in Figs. 4 and 5, and when both rotors are rotating at the same speed, the pin 108 remains in whatever position it may occupy in the recess 107. However, when the rotor R2 rotates more slowly than the rotor R1, and because of the frictional engagement between ring 105 and rotor R1, the ring 105 advances with rotor R1 until pin 108 engages the left-hand end of recess 107 and the switch afforded by contact 110 and sleeve 78 and segment 81 remains open, the parts being shown in this position in Fig. 4.

But when rotor R1 rotates more slowly than rotor R2, then ring 105 lags rotor R2 until pin 108 engages the right-hand end of recess 107, as it is viewed in Fig. 4, and thereupon the switch afforded by contact 110 and sleeve 78 and segment 81 is closed and remains closed until rotor R2 rotates more slowly than rotor R1.

Whenever contact 110 bridges the gap between sleeve 78 and segment 81, the relay 41 is energized, the circuit being as follows: From one terminal of the source of current B2 through conductor 72, contact 74, Fig. 3, conductor ring 80, web 79, sleeve 78, Fig. 4, contact 110, conductive segment 81, conductive web 83, contact 84, Fig. 3, conductor 86, Fig. 2, the winding of the relay 41, conductors 88 and 71 to the other terminal of the source of current B2 which will energize the relay 41 and cause the armature 40 thereof to be attracted into engagement with the contact 39 which, as explained hereinabove, results in energization of the solenoid 30, provided the armature 42 is engaging the contact 43.

It will be understood that if the pin 108 is so disposed in recess 107 that contact 110 does not bridge the gap between sleeve 78 and segment 81 then the relay 41 is not energized and if armature 42 engages contact 43 under this condition the solenoid 31 will be energized.

As stated hereinabove, in the normal operation of railway equipment it is believed that there is no appreciable slippage at the points of contact of the wheels with the rails and the wheels roll along the rails. During a braking operation effective on the wheels of such equipment the retarding forces react at the rails to slow down the rolling movement of the wheels and so long as the adhesion between each wheel and the rail on which it rolls exceeds the retarding force effective on the wheel, the wheel is retarded without appreciable slippage at the contact thereof with the rail. However, when the retarding force in a braking operation exceeds the adhesion between a wheel and the rail on which it normally rolls, the wheel slips on the rail and is thereafter retarded at a rate exceeding that at which it would have been retarded had not the slippage occurred, and as a result the wheel comes to rest prematurely and thereafter slides along the rail.

Where either the rotor R1 or R2 is connected to a wheel which, when retarded in the manner just described, slows down abnormally and the other rotor is connected to a wheel which continues to roll on the rail, it is apparent that the rotor connected to the wheel which is rotating the more slowly will move relative to the other rotor in relatively rapid manner whereupon the contacts or brush 95 will engage the contact strips 90 and 91 in rapid succession. The rapidity with which the brush 95 so successively engages the contact strips 90 and 91 is directly proportionate to the magnitude of the difference in the rates of rotation of the wheels. The magnitude of such difference is relatively great when only one of the wheels slips on the rail while the other continues to roll on the rail. However, it has been observed, where several wheels slip on the rails at the same time, that the wheels do not slow down at the same rate, this probably being due to varying conditions at the several wheels. Hence, where both the wheels to which the rotors R1 and R2 are respectively connected slip on the rail, it is very unlikely that they will slow down at the same rate and hence even in this condition there will be relative movement between the rotors R1 and R2 and the brush 95 will successively engage the contact strips 90 and 91.

As explained heretofore, the contact strips 90 and 91 and the contacts or brush 95 are so arranged in circuit with the slow-to-release relays SR1 and SR2 that when the brush 95 engages the contact strip or conductive segment 91 the relay SR1 is energized, and when the brush 95 engages the contact strip 90 the relay SR2 is energized. Each of these relays is maintained energized so long as the brush 95 remains in engagement with the contact strip in circuit with the particular relay and when, for example, the relay SR1 is energized it attracts its armature 98 which thereupon engages the contact 99. Likewise when relay SR2 is energized it attracts its armature 101 which thereupon engages the contact 102. Furthermore, each of these relays, being a slow-to-release relay, remains operative after circuit thereto is broken, that is to say, for a predetermined time after circuit to the relay is broken its armature remains in engagement with the contact engaged by the armature upon energization of the relay, this being an inherent characteristic of a slow-to-release relay.

Hence, when the brush 95 successively engages the contact strips 90 and 91 in such a way that one contact strip is disengaged and the other strip is engaged and the relay in circuit with the second of the strips so engaged is energized in a period of time less than the predetermined time, the relay in circuit with the first of said strips remains operative after circuit thereto is broken, by disengagement of the brush 95 from the contact strip in circuit therewith, then both the relays SR1 and SR2 are simultaneously operative. When this occurs both the armatures 98 and 101 are engaged with their cooperating contacts 99 and 102 and circuit is closed through the winding of relay SR3 whereupon a control operation, such as release of the braking means effecting retardation of the wheels, is effected, as will be more fully explained presently.

It is recognized that by reason of conditions encountered in the actual use of railway equipment there will be differences in the rates of rotation of wheels even when all the wheels are normally rolling along the rails. Such differences in rates of rotation may be due to differences in the diameters of the wheels at the lines of contact thereof with the rails. In fact there may be variations in the diameter of a single wheel at the line of contact thereof with the rail as the wheel rolls along the rail due to movement of the wheel in an axial direction. Since such conditions will exist, it is apparent that all differences in rates of rotation between wheels, to which rotors as R1 and R2 are respectively connected, should not cause these rotors to so rotate relative to each other that a control operation will be brought about. A control operation is not required unless an abnormal condition exists. To avoid a control operation unless an abnormal condition exists, provision is made to care for an extreme condition in actual operation, that is, a condition quite unlikely to be encountered, and the apparatus is so arranged that a control operation will not be effected under such extreme condition. In selecting such an extreme condition, one is chosen that will bracket other similar conditions and improper or undesired effecting of a control operation is therefore avoided.

An example of such an extreme condition is where railway equipment is operating at a speed of one hundred twenty miles per hour and the difference in diameters of the wheels to which the rotors R1 and R2 are connected is one inch at the lines of contact of such wheels with the rail or rails on which they normally roll as, for example, where the diameter of one wheel at the line of contact thereof with the rail is thirty-two inches and the diameter of the other wheel at the line of contact thereof with the rail is thirty-three inches. If a condition such as this prevailed the rotors R1 and R2 would rotate relative to each other even in normal operation and in the absence of slippage on the rail for there would be a difference in rotation therebetween of .634 revolution per second.

Each of the contact strips 90 and 91 extends over one-fourth of the circumference of the wall of the recess 89 so that there is a ninety degree interval intermediate adjacent ends of the strips as well as a ninety degree extent of the strips. Thus, under the foregoing conditions where there is a difference of .634 revolution per second in the rotation of the rotors R1 and R2 it will require .394 second for the brush 95 to travel from the end of one contact strip 90 or 91 to the adjacent end of the other contact strip. Hence if the slow-to-release relays SR1 and SR2 are timed to remain operative, after circuit thereto is broken, for less than .394 second, the armatures 98 and 101 will not be simultaneously engaged with their cooperating contacts 99 and 102 under the extreme condition mentioned above which is an operating speed of one hundred twenty miles per hour and a difference in the diameters of the wheels at the lines of contact with the rail of one inch.

It is, however, advantageous to afford a safety factor. Hence the slow-to-release relays may be timed to remain operative after circuit thereto is broken for approximately .242 second. In this circumstance, in order for the armatures 98 and 101 to be simultaneously engaged with their cooperating contacts it is necessary for there to be such relative rotation between the rotors R1 and R2 that the brush 95 will move from engagement with one of the contact strips 90 or 91 into engagement with the other of the contact strips in .242 second or less. It will be apparent that this is well beyond the time required for such successive engagement in the extreme condition described above which means that a control operation will not be brought about under normal operating conditions.

However, where slippage occurs between a wheel, to which one of the rotors R1 or R2 is connected, and the rail on which the wheel rolls, and the other wheel does not slip, or even if there is slippage between both wheels to which the rotors are respectively connected, and the rail or rails on which such wheel or wheels normally rolls or roll, there will be appreciable relative rotation between the rotors R1 and R2. Furthermore, once a wheel slips on the rail it thereafter, so far as its rotative movement is concerned, slows down rapidly and therefore almost or actually simultaneously with wheel slippage relative rotation between the rotors R1 and R2 is set up. Hence as soon as slippage occurs the brush 95 starts moving rapidly from engagement with one contact strip 90 or 91 into engagement with the other of the contact strips. Moreover as soon as the time required for the brush 95 to move from one contact strip to the other is equal to or less than .242 second, both the armatures 98 and 101 will be engaged with their cooperating contacts 99 and 102 whereupon circuit will be closed to the winding of relay SR3 to effect a control operation. Since slippage causes relatively great relative rotation between the rotors R1 and R2, the brush 95 will move from one contact strip to the other in .242 second or less practically simultaneously with the initiation of wheel slippage.

While it is necessary that simultaneous engagement of the armatures 98 and 101 with their cooperating contacts is to be avoided in normal operation, it is desirable to establish this simultaneous cooperation promptly under abnormal conditions, as when slippage occurs, and to illustrate the promptitude with which this would be brought about under abnormal conditions it is possible to effect simultaneous closing of the switches, of which the armatures 98 and 101 are a part, by only having slightly more than ninety degrees of relative rotation between the rotors R1 and R2 for the brush 95 may be near the end of one contact strip at the time rapid relative rotation between the rotors R1 and R2 is initiated and thus the brush need only move slightly more than ninety degrees to engage the other contact strip and effect simultaneous closing of the switches. It will be recognized that such movement may be effected very rapidly and from this it will be seen that the device is quite sensitive to abnormal differences in the rates of rotation between wheels as FW and RW.

To further explain the simultaneous closing of the switches, of which the armatures 98 and 101 are a part, when an abnormal condition arises as, for example, in event of wheel slippage in the course of a braking operation, if the relays SR1 and SR2 have a release time of approximately .242 second and the diameter of both the wheels FW and RW at the lines of contact thereof with the rails is approximately thirty-three inches, (in this circumstance there will be no relative rotation between the rotors R1 and R2 in normal operation) a difference in the rates of rotation of the wheels equivalent to approximately six miles per hour will cause the brush 95 to move from association with one contact strip 90 or 91 into engagement with the other contact strip in approximately .242 second and in proportionately less time as the difference in the rates of rotation increases.

Since it is probable that the rotors R1 and R2 will be rotating relative to each other even in normal operation, a further example of the operation of my novel apparatus, with particular reference to the extreme condition explained above, is now set forth. In such an extreme condition, entailing the connection of the rotors R1 and R2 respectively to wheels having an inch difference in diameter, that is, where one wheel is approximately thirty-two inches in diameter at the line of contact thereof with the rail and the other wheel is approximately thirty-three inches in diameter at the line of contact thereof with the rail, there will normally be, in the absence of wheel slippage on the rail, a difference of approximately .634 revolution per second in the rates of rotation of the wheels at one hundred twenty miles per hour. This is equivalent to a speed of approximately three and three-quarters miles per hour at the circumference of a thirty-three inch wheel. Now if, in such circumstances, the smaller wheel slips on the rail so as to alter the normal difference in the rates of rotation of the wheels, a difference in the rates of rotation between the wheels equivalent to approximately a speed of nine and three-quarter miles per hour at the circumference of a thirty-three inch wheel will cause the brush 95 to move from engagement with one contact strip 90 or 91 into engagement with the other contact strip in approximately .242 second and in proportionately less time as the difference in rates of rotation increases.

From the foregoing it will be apparent that wherever the difference in the rates of rotation between wheels as FW and RW is such that the brush 95 moves from engagement with one contact strip 90 or 91 into engagement with the other strip in less than .242 second, when the relays SR1 and SR2 have a release time of .242 second, then a control operation is initiated. In the present instance the control operation entails energization of either the solenoid 30 or the solenoid 31 to thereby operate either the valve 28 or the valve 29. In the present instance these valves are combined check and vent valves and so long as the solenoids 30 and 31 thereof are deenergized these valves are inoperative. When, however, one or the other of these solenoids is energized the valve is rendered operative whereupon the flow of air under pressure from the pipe 7 to either the pipe 10 or the pipe 11, depending upon which of the valves 28 or 29 is operated, is shut off and such pipe 10 or 11 is vented through the vent portion of the operated valve to thereby relieve either the cylinders 12 and 13 or the cylinders 14 and 15 of pressure whereupon the brake elements operated from said cylinders are rendered inoperative. An arrangement such as this is effective to bring about a release of the braking means but it will be understood that other types of valves could be substituted for the combined check and vent valves 28 and 29 which would be effective to reduce the effectiveness of the braking elements rather than to bring about release thereof, such an arrangement being equally within the purview of my invention.

This invention primarily pertains to bringing about energization of either the solenoid 30 or the solenoid 31 to effect operation of the valves as 28 and 29 to bring about a release or reduction in effectiveness of the braking means associated with the wheel or wheels that is or are abnormally slowing down at the greater rate in the course of a braking operation and, as has been explained heretofore, this is effected either by permitting the relay 41 to remain deenergized or by bringing about energization of this relay.

When in the course of a braking operation the front wheel or wheels FW slow down in the course of a braking operation more rapidly than the rear wheel or wheels RW, the rotor R1 rotates more slowly than the rotor R2 and when such difference in rotation is sufficiently great to cause the contacts or brushes 95 to move from engagement with one or the other of the contact strips 90 or 91 and into engagement with the other of such strips in less than the release time of the slow-to-release relay which was energized by reason of the brush 95 engaging a particular one of the contact strips 90 or 91 in circuit with this particular relay, then as explained hereinabove the slow-to-release relay SR3 is rendered operative. Once this relay is rendered operative it remains operative for at least a predetermined period of time. For example, if the slow-to-release relays SR1 and SR2 are rendered operative simultaneously for only a period of time sufficiently long to bring about energization of the slow-to-release relay SR3, this relay will nevertheless remain operative for a period of time equal to its release time. In any event, after circuit is broken to the slow-to-release relay SR3 by the disengagement of either the armature 98 from its contact 99 or the armature 101 from its cooperating contact 102, the relay SR3 nevertheless remains operative for a period of time equal to its release time. Thus, whenever the slow-to-release relay SR3 is rendered operative, the armature 42 remains in engagement with its cooperating contact 43 to close circuit to either the solenoid 30 or the solenoid 31 for at least a predetermined period of time.

In an instance such as that to which reference has just been made where the front wheel FW slows down more rapidly than the rear wheel RW at each instant during the course of such slowing down the rotor R2 will be rotating more rapidly than the rotor R1 and therefore the pin 108 or rotor R2 will move clockwise, as viewed in Fig. 4, through the recess 107, and the relative movement that is thus occasioned between the ring 105, in which the contact 110 is mounted, is such that the contact 110 bridges the gap between the sleeve 78 and the conductive segment 81. When this occurs the above described circuit to the relay 41 is closed and this relay thereupon energizes.

Thus, whenever the front wheels FW slow down more rapidly than the rear wheels RW in the course of a braking operation and under such conditions that the slow-to-release relay SR3 is energized, then circuit will be closed to the solenoid 30 for under this circumstance the relay 41 will be energized and the armature 40 thereof will be attracted into engagement with the contact 39 which establishes circuit through the armature 42 to the solenoid 30. The energization of the solenoid 30, in the present instance where this solenoid is associated with the combined check and vent valve 28, shuts off the supply of fluid under pressure through the pipe 10 to the cylinders 12 and 13 and vents this pipe whereupon the pressure effective on these cylinders is relieved and the braking elements, in this instance the shoes 17 and 21, are released. Such release of the shoes frees the wheel FW and, of course, the other wheel mounted on the axle FA, of the retarding force effective thereon, wherefore the adhesion between this wheel and the rail on which it normally rolls will inevitably be sufficient to interrupt slipping of this wheel or wheels on the rail or rails and the wheel or wheels will thereupon resume rolling along the rail or rails.

If the wheels on the axle FA under such circumstances resume rolling on the rails during the time fluid under pressure is still being supplied through the pipe 7, upon the release of the slow-to-release relay SR3 which will follow the resumption of such rotation of the rotors R1 and R2 that the brush 95 no longer moves from one contact strip 90 or 91 into engagement with the other in less than the release time of the relays SR1 and SR2, then the resultant opening of the circuit by the disengagement of the armature 42 from the contact 43 upon release of the slow-to-release relay SR3 will deenergize the solenoid 30 and thereupon fluid under pressure will again be supplied to the cylinders 12 and 13 whereupon the brake elements as the shoes 17 and 21 will again be applied to the wheels as FW and the braking operation effective on these wheels will be resumed.

If, however, in the course of a braking operation the rear wheels RW slow down more rapidly than the front wheels FW and the difference in the rates of rotation between these wheels and therefore the rotors R1 and R2 is such as to result in energization of the slow-to-release relay SR3 then in such circumstances the rotor R2 will at each instance in the course of such slowing down be rotating more slowly than the rotor R1 wherefore the ring 105 will so rotate that the pin 108 will be positioned as shown in Fig. 4 and as explained hereinabove when the pin is so positioned the relation between the ring 105 and the contact 110 carried thereby and the stem portion 77 and the conductive sleeve 78 and the conductive segment 81 thereon is such that the contact 110 is positioned as shown in Fig. 4, in which position it does not bridge the gap between the sleeve 78 and the conductive segment 81 and therefore circuit to the relay 41 is not closed wherefore this relay remains deenergized and its armature 40 remains in engagement with the contact 36 whereupon circuit is closed to the solenoid 31.

What has been said hereinabove with respect to closing of the circuit to the solenoid 30 applies with equal force to the closing of the circuit to the solenoid 31 except that in this instance it will be the braking elements such as the shoes 23 and 27 which are released to thereby free the wheels as RW from the retarding force effective thereon.

If a condition should arise in which both the wheel or wheels to which the rotor R1 is connected and the wheel or wheels to which the rotor R2 is connected exhibit a tendency to slide and if in such circumstances the rotor R1 is slowing down more rapidly than the rotor R2, which is indicative that the wheel or wheels with which the rotor R1 is connected will probably slide before the wheel or wheels with which the rotor R2 is connected, then since the rotor R1 is rotating more slowly than the rotor R2, the hereinabove described operation which results in the energization of the solenoid 30 takes place whereupon the braking means effective on the wheels as FW are released or otherwise reduced in effectiveness. Thereupon the rotor R1 will pick up speed and if the wheels with which the rotor R2 is connected still exhibit a tendency toward sliding at this time, then in the manner hereinabove described and with the results explained above, the solenoid 31 is energized. It will also be understood that the reverse of what has just been described would take place if both the rotors R1 and R2 were abnormally slowing down and the rotor R2 was slowing down at the greater rate for in this instance, first the solenoid 31 and then the solenoid 30 would be energized. From this it will be seen that the arrangement which I have provided is one which is capable of switching back and forth, if the need so to do should arise, as in a circumstance such as that just referred to where both the rotors R1 and R2 are abnormally slowing down, for in such instances, as has been previously explained, it is unlikely that the rotors will slow down at the same rate where they are respectively connected to wheels which exhibit a tendency to slide in the course of a braking operation.

Thus it will be seen that whenever an arrangement is provided for detecting an abnormal difference in the rates of rotation in the course of a braking operation between different wheels or sets of wheels that are retarded in a braking operation by independent braking means, the above described apparatus and equivalents thereof will be effective to release only the braking means effective on the wheel or set of wheels that is slowing down at the greater rate under the aforesaid conditions. This discrimination, which analyzes or determines the cause of the detected abnormal condition, will permit the other braking means to remain effective and, by reason of this, maximum efficiency of the braking means may be realized but at the same time objectionable wheel sliding may be avoided.

It will be manifest that in order for the above described apparatus to be effective to bring about release of the particular braking means effective on the front wheel as FW or the rear wheel as RW, depending upon which of said wheels is abnormally slowing down in the course of a braking operation, the rotors R1 and R2 must be rotated clockwise, as viewed in Fig. 4, for if these rotors were rotated in the opposite direction the movement of the ring 105 would be opposite to that hereinabove described and under such circumstances a result opposite to that hereinabove described would be attained. The reason for this is that if the rotors R1 and R2 rotated counterclockwise, as viewed in Fig. 4, the ring 105 would follow the rotor R1 when it was rotating more rapidly than the rotor R2 and this would engage the pin 108 with the right-hand end of the recess 107 wherefore circuit would be established to the relay 41 and if, under such circumstances, the brush 95 moved from engagement with one contact strip 90 or 91 into engagement with the other in less time than the release time of the consequently previously energized slow-to-release relay SR1 or SR2, circuit would be established to the solenoid 30 controlling the supply of fluid under pressure to the braking means for the wheels as FW which would be the wheels which were not so abnormally slowing down that release or reduction in effectiveness of its braking means should be brought about to avoid wheel sliding. It is for this reason that the apparatus, as disclosed in Figs. 1 to 5, is particularly adapted for use on equipment which, as explained hereinabove, is normally operated in but a single direction.

However, there are many instances where it will be desirable to use an apparatus such as that which has been described on equipment which is capable of being operated in either direction and an arrangement which will enable this to be accomplished is illustrated in Fig. 6.

The arrangement illustrated in Fig. 6 is one which will establish a circuit, such as is closed by the engagement of the armature 42 with the contact 43, to the solenoid associated with the valve controlling the flow of fluid under pressure to the braking means that should be released, as explained hereinabove, in the course of a braking operation in order to avoid wheel sliding. This entails establishing certain circuits when the equipment with which the apparatus is used is operating in one direction and other circuits when the equipment with which it is used is operating in the other direction for, in one such circumstance, the rotors R1 and R2 will be rotating clockwise and, in the other of such circumstances, said rotors will be rotating counterclockwise when the equipment on which they are included is in motion. Such selective establishing of circuits can expeditiously be effected, as shown in Fig. 6, by providing a switching device which will selectively establish such circuits.

In the present instance this switching device includes a member 114 that is fast to the shaft 52 of the switch S and which has an endless screw 115 in the periphery thereof. A screw follower 116 is provided which is pivotally mounted as indicated at 117 and which is acted on by springs 118 and 119, the spring 118 urging the follower 116 to the left, as viewed in Fig. 6, and the spring 119 urging this follower to the right, as it is viewed in Fig. 6. When the shaft 52 is rotating in the direction of the arrow 120, Fig. 6, the screw 115 maintains the follower 116 in the position shown in Fig. 6 against the action of the spring 119 but when the shaft 52 rotates in the opposite direction the follower 116 is maintained at the other end of the screw against the action of the spring 118. The shaft 52 rotates in the direction of the arrow 120 when the equipment on which the switch S is mounted is moved in such a direction that the rotors R1 and R2 rotate in the direction hereinabove described with reference to Figs. 1 to 5 in which circumstance the results hereinabove described are to be realized.

In the form of the invention illustrated in Fig. 6, the conductors 35 and 38 that lead from the contacts 36 and 39 of the relay 41 are respectively led to terminals 112 and 113 instead of directly to the solenoids as hereinabove described. A conductor 123 leads from the terminal 112 to a contact 124 that is engaged by a contact 125 when the follower 116 is in the position in which it is shown in Fig. 6. A conductor 126 is connected to the contact 125 and to another contact 127 on the follower 116 and leads to the end of the winding of the solenoid 31 to which the conductor 35 is shown connected in the form of the invention shown in Fig. 2. A conductor 128 leads from the terminal 113 to a contact 129 that is engaged by a contact 130 on the follower 116 when said follower is in the position shown in Fig. 6. A conductor 131 is connected to this contact 130 and to another contact 132 on the follower 116 and leads to the end of the winding of the solenoid 30 to which the conductor 38 is shown connected in the form of the invention shown in Fig. 2. It will therefore be seen that with the follower 116 in the position in which it is shown in Fig. 6 circuits are set up which are identical with those hereinabove described with reference to Fig. 2 and therefore when a condition of wheel sliding arises an operation identical with that hereinabove described is brought about.

For example, in the instance hereinabove described when the relay 41 is not energized and the armature 40 thereof remains in engagement with the contact 36, circuit is closed upon engagement of the armature 42 with the contact 43 when the slow-to-release relay SR3 energizes under the conditions described hereinabove from one terminal of the battery B1 through conductor 44, contact 43, armature 42, conductor 45, armature 40, contact 36, conductor 35, conductor 123, contact 124, contact 125, conductor 126, winding of solenoid 31, and conductors 34 and 32 back to the other terminal of the battery B1 whereupon the braking means effective on the wheels as RW is released, in the present instance to avoid a wheel sliding condition on these wheels. It will be understood that when the apparatus shown in Fig. 6 is employed it is immaterial which are the front and which are the rear wheels for the wheels as FW will only be front wheels when the equipment of which they are a part is operated in such a direction that these wheels are leading and when the equipment is operated in the other direction the wheels designated FW will be rear wheels. What has just been said with respect to the wheels FW is also applicable in so far as the wheels RW are concerned.

When, however, it is the wheels as FW that are starting to slide and, as explained hereinabove, the relay 41 is energized, the circuit is closed upon energization of the slow-to-release relay SR3 from one terminal of the battery B1 through conductor 44, contact 43, armature 42, conductor 45, armature 40, contact 39, conductor 38, conductor 128, contact 129, contact 130, conductor 131, the winding of solenoid 30 and conductors 37 and 32 to the other terminal of the battery B1 whereupon the braking means effective on the wheels as FW are in the present instance released.

However, as explained hereinabove, if the shaft 52 rotates in a direction opposite to the arrow 120, Fig. 6, then the follower 116 assumes a position such that the contacts 125 and 130 thereon are disengaged from the contacts 124 and 129 and wherein contacts 127 and 132 thereon are respectively engaged with the contacts 133 and 134 and this reverses the connections established by engagement of the contacts 124 and 125 and 129 and 130 for when the rotors R1 and R2 are rotating in a direction opposite to the direction of the arrow 120, Fig. 6, the ring 105, which tends to follow the rotor R1, will so move that the pin 108, Fig. 4, will be disposed at the right-hand end of the recess 107, as it is viewed in Fig. 4, when the rotor R1 rotates more rapidly than the rotor R2, and in such a circumstance the contact 110 will be bridging the gap between the sleeve 78 and the conductive segment 81 and the armature 40 will, in this instance, be engaged with the contact 39 which, it will be seen, is a condition opposite to that which prevails when the parts shown in Fig. 4 are rotated clockwise, as explained above. It is because of this condition that it is necessary to reverse the operation hereinabove described.

Thus when a wheel sliding condition arises in the wheels as RW, which will be front wheels when the equipment is operated to cause the rotors R1 and R2 to rotate counterclockwise, as viewed in Figs. 4 and 5, and circuit should be closed to the solenoid 31, the ring 105 will move with the more rapidly rotating rotor R1 and cause the pin 108 to be located at the right-hand end of the recess 107, as it is viewed in Fig. 4, and in such circumstances, when the armature 42 engages the contact 43 circuit is closed from one terminal of the battery B1 through conductor 44, contact 43, armature 42, conductor 45, armature 40, contact 39, conductor 38 to terminal 113 from which a conductor 135 leads to contact 133; and since in this instance this contact will be engaged by the contact 127 circuit will be continued through conductor 126, winding of solenoid 31 and conductors 34 and 32 back to the other terminal of battery B1 which, as explained hereinabove, will bring about release of the braking means effective on the wheels as RW to thereby relieve the retarding force effective on these wheels with the effect hereinabove described.

When, however, with the shaft 52 rotating in a direction opposite to the arrow 120, Fig. 6, the wheels as FW start to slide, then upon energization of the slow-to-release relay SR3 circuit is closed from one terminal of the battery B1 through conductor 44, contact 43, armature 42, conductor 45, armature 40, contact 36 and conductor 35 to terminal 112 from which a conductor 136 leads to the contact 134 which at this time will be engaged by the contact 132 wherefore circuit is continued through the conductor 131, the winding of solenoid 30 and conductors 37 and 32 back to the other terminal of battery B1. This will bring about energization of the solenoid 30, wherefore, as explained hereinabove, the front wheels FW will be relieved of the retarding force effective thereon so that in the manner hereinabove described the wheel sliding condition may be avoided. In this latter circumstance the ring 105, which tends to follow the rotor R1, that under such circumstances will be rotating slower than the rotor R2, will so lag in its rotation that the pin 108 will assume the position in which it is shown in Fig. 4 which, as explained above, opens circuit to the relay 41.

In the wiring diagrams, Figs. 2 and 6, I have shown three sources of current such as the batteries B1, B2 and B3, but it is to be understood that the showing of three sources of current is merely to facilitate illustration of this invention and while, if desired, three such independent sources of current could be employed, resort could be had to an arrangement wherein but a single source of current was afforded.

The switch S which is illustrated herein is a modification of the switch shown in Fig. 2 of my above referred to co-pending application Serial No. 213,103, filed June 10, 1938, but it is to be understood that the switch there illustrated or other of the switches shown in that application or equivalent means could be substituted for the switch S shown and described herein so long as a shifting arrangement such as that which is afforded by the ring 105 herein and its associated mechanism or some other equivalent apparatus is associated with such switches.

It is also to be understood that, while the arrangement of the relays SR1, SR2 and SR3 in the present instance corresponds to the arrangement of relays illustrated in Fig. 5 of my aforesaid co-pending application, the other arrangements illustrated in that application for bringing about a release or a reduction in effectiveness of the braking means when a tendency toward wheel sliding arises in the course of a braking operation could be substituted for the arrangement of the relays SR1, SR2 and SR3 herein shown and described and, in event it was not desired that a release or reduction in effectiveness of the braking means for at least a predetermined period such as is afforded by the utilization of a slow-to-release relay as the slow-to-release relay SR3 herein, resort could be had to an arrangement such as that for example which is disclosed in Fig. 1 of my aforesaid co-pending application.

In the embodiment shown in Figs. 7 and 8 of the drawings I have diagrammatically illustrated a slide-detecting means of my invention in association with a front axle FA (Fig. 7) and a rear axle RA which may correspond with the front axle and rear axle of Fig. 1. The construction of Figs. 7 and 8 is so arranged that the moving parts of the speed comparing mechanism may be mounted directly on the front and rear axles, thereby avoiding the necessity for the extension of mechanical drive means from these axles.

In accordance with the invention embodied in the structure of Figs. 7 and 8, the operative relation between the relatively moving elements of the speed comparing mechanism is established by electrical means, so that a pair of slow-to-release relays SR1 and SR2 are energized alternately as an incident to variation in the rotative speeds of the axles FA and RA.

The slow-to-release relays SR1 and SR2 are provided with armatures 130 and 131 respectively which upon energization of the relays are engaged with contacts 132 and 133 respectively. The armature 130 is connected by a wire 134 to one terminal of a battery B3, while the second armature 131 is connected in series by a wire 135 extending from the contact 132 to the armature 131. From the contact 133 a wire 136 extends to one end of the winding of a relay SR3, while another wire 137 extends from the other end of the winding to the other terminal of the battery B3.

The relay SR3 has an armature 138 engageable with a contact 139, and by means of a pair of leads 140 and 141 extending from the armature 138 and contact 139, engagement of the armature 138 with the contact 139 may serve to control a valve such as the valves 28 and 29 of Fig. 1. For such use it is preferable that the relay SR3 be of the slow-to-release type so as to obviate hunting in the control system.

The embodiment of Figs. 7 and 8 contemplates actuation and control of the brake on the front and rear wheels in unison, this control being exercised by the relay SR3 and the associated circuit 140—141. It will be evident, of course, that the actuation of the relay SR3 takes place only when one of the slow-to-release relays SR1 or SR2 is actuated prior to the release of the other of these two relays, this functioning being the same as in the embodiment shown in Fig. 2. The form shown in Figs. 7 and 8 however attains the successive or alternate actuation of the relays SR1 and SR2 by different means, the distinguishing characteristic of which is the direct mechanical association of the required moving elements with the axles FA and RA.

In attaining this direct mounting of the moving elements, I provide a pair of internal commutators C1 and C2, Fig. 7, which are mounted in association with the front and rear axles FA and RA. The commutator C1 has a cup-like housing 142 fixed to the bearing cover plate 143 of the front axle FA in such a relation as to enclose the end of the axle FA. Within the housing 142 the cylindrical commutator rotor 144 is fixed as by a pin 145, in axial relation on the axle FA. In a cylindrical inner surface of the stationarily mounted housing 142 a plurality of commutator bars 146 are mounted in insulated relation, the housing 142 preferably being made of insulating material so as to facilitate such electrical insulation of the commutator bars 146.

As the rotor 144 rotates within the stationary housing 142, the commutator bars 146 are successively engaged by a brush 147 which is radially slidable in a bore 148 in the rotor 144 and is urged outwardly into contact with the commutator surface by a spring 149. From the brush 147 a conductor 150 extends to a slip ring 151 located on the periphery adjacent one end of the rotor 144, and this slip ring 151 is engaged by a spring-pressed brush 152 which is radially slidable in a bore 153 in the housing 142.

The other commutator C2 has a generally similar insulating housing 142' stationarily mounted on the bearing cover 143' so as to enclose a rotor 144' fixed on the end of the axle RA. A series of commutator bars 146' is provided in the housing 142'. On the rotor inwardly of the commutator bars 146' two slip rings 155 and 156 are mounted which are respectively engaged by spring-pressed radially-positioned brushes 157 and 158.

The brush 157 is connected by a wire 159 to one end of the winding of the relay SR2, the other end of which is connected by wires 160 and 161 to one side of a source of current such as battery B2. The brush 158 is connected by a wire 162 to one end of the winding of the relay SR1, the other end of which is connected by a wire 163 at the juncture of wires 160 and 161. The other terminal of the battery B2 is connected by a wire 164 to the brush 152 of the other commutator C1.

In order that relative rotation of the two axles FA and RA may cause alternate and successive energization of the relays SR1 and SR2, the two commutators C1 and C2 are constructed with an equal number of commutator bars 146 and 146', and as shown in Fig. 8, corresponding bars 146 and 146' are connected by a series of wires 165 all of which may be housed in a suitable cable (not shown) extending between the commutators C1 and C2.

As shown in Fig. 8, the rotor 144' of the commutator C2 has a pair of brush devices 166 and 167 disposed on opposite sides of its axis for engagement with the bars 146', and in order that each brush device may contact a substantial arc of the commutator surface, each brush device is relatively wide in a circumferential direction. In the present form each of the brush devices 166 and 167 comprises a plurality of segmental sections 166' and 167' respectively which are individually actuated or pressed in an outward radial direction by springs 168.

As shown in Fig. 7, the brush device 166 is connected by a conductor 169 to the slip ring 156, while the brush device 167 is connected to the slip ring 155 by a conductor 170. Thus the relay SR1 is at all times connected through wire 162, brush 158, slip ring 156, conductor 169 and the brush device 166 to a plurality of adjacent commutator bars 146'; and these particular bars 146' are in circuit with a corresponding series of adjacent commutator bars 146 in the commutator C1. For the purpose of illustration of the operation of the device, we may consider the rotor 144' as being stationary so that, as the rotor 144 revolves, its brush 147 will pass across the series of commutator bars 146 which are connected to the relay SR1. Hence, while the commutator brush 147 is thus engaged, a circuit will be established to relay SR1 from the brush 147 through conductor 150, slip ring 151, brush 152, wire 164, battery B2 and wires 161 and 163.

It will be clear, therefore, that in each relative rotation between the two commutator rotors 144 and 144', the relay SR1 will be energized; and a similar energization of relay SR2 also results, alternately with respect to the energization of relay SR1. Thus, the relay SR2 is at all times connected by wire 159, brush 157, slip ring 155, conductor 170 and brush device 167 to a plurality of adjacent commutator bars 146', which are in turn connected by their wires 165, Fig. 8, to a corresponding group of commutator bars 146 in the commutator C1. By reason of the fact that corresponding bars of the two commutators are connected by the wires 165, it will be seen that the group of bars 146 and 146' which are in circuit with the relays SR1 and SR2 will at all times be diametrically opposite from each other and will be angularly coextensive with the brush devices 166 and 167 respectively.

In the present instance the brush devices 166 and 167 are each of a 90° angular extent, since such a size produces a satisfactory and desirable result in the same sense as has been described in connection with the apparatus of Fig. 5. With this proportioning of the brush devices 166 and 167, the relays SR1 and SR2 are chosen with a release period or release time of substantially .242 second, for as previously explained, this timing provides an adequate factor of safety against release of the brakes for reasons other than wheel sliding.

From the foregoing it will be evident that the embodiment illustrated in Figs. 7 and 8 provides for comparison of the speeds of the front and rear wheels of a truck and for detection of variations in their relative speeds, and further, that this embodiment is such that the rapidly moving or rapidly driven parts are secured directly to the front and rear axles. This form of detecting means, when associated with relay means such as the two slow-to-release relays SR1 and SR2 serves to detect variation of the relative rotative speeds of the axles beyond the predetermined permissible range, and to initiate the requisite control operation so as to obviate or correct the detected wheel-sliding condition.

Reference has been made hereinabove to either releasing or reducing the effectiveness of the braking means of railway equipment but it will be understood that, whether the braking means is fully released or merely reduced in effectiveness, the result in both instances is a reduction in effectiveness of the braking means. Thus, where reference is made herein to reduction in effectiveness, it will be understood that it is intended to refer to either a mere reduction in effectiveness or full release of the braking means.

Furthermore, in so far as the control operation is concerned that is brought about by my invention, and in so far as it pertains to a braking operation, this control operation could be the release of sand or the like ahead of the point of contact of a particular wheel or particular wheels with the rail or rails so as to thereby increase the adhesion between the wheel and the rail. Thus, my invention is primarily a means for detecting a condition which requires a control operation to alleviate it, and where such condition arises in a braking operation the control operation need only be such as will insure sufficient adhesion between a wheel and the rail on which it normally rolls that wheel sliding may be avoided.

It will be understood from the foregoing description that I have provided an arrangement wherein the release or reduction in effectiveness of only the braking means which is associated with a wheel or set of wheels that start to slide in the course of a braking operation may be brought about in an arrangement wherein the tendency toward a wheel sliding condition is detected by operating devices at rates proportionate to the rates of rotation of different wheels or sets of wheels that are retarded by independent braking means. Furthermore, I have provided an arrangement which may be utilized on equipment which is normally operated in service with a particular end thereof faced forwardly and I have also illustrated how my invention may be utilized on railway equipment which in service is operated with either end thereof faced forwardly.

It will be understood that in the foregoing I have described what I now consider to be the best mode in which I contemplate applying my invention but it is to be understood that this is capable of variation and modification and I therefore do not wish to be limited to the precise details set forth but desire to avail myself of such changes and alterations as fall within the ambit of the following claims.

I claim:

1. In a device for detecting a difference in relative rotation of two relatively rotatable elements, the combination of a pair of rotatable members positioned coaxially and in spaced relation to each other, means respectively connecting said members to said elements for driving said members rotatively in the same direction with respect to each other and at speeds respectively proportionate to the rotative speeds of the corresponding elements, a third member interposed between said pair of members and yieldingly connected to one of such members for normal rotative movement therewith, means positively limiting movement of said third member relative to the second of said pair of members to within predetermined alternative positions relative thereto in dependence upon the direction of relative rotation of such members, and means responsive to said third member when it occupies either of said alternative positions with respect to said second member for indicating the difference in relative rotation of said elements.

2. In a device for detecting a difference in relative rotation of two relatively rotatable elements, the combination of a pair of rotatable members positioned coaxially and in spaced relation to each other, means respectively connecting said members to said elements for driving said members rotatively in the same direction with respect to each other and at speeds respectively proportionate to the rotative speeds of the corresponding elements, a third rotatable member coaxial with and interposed between said pair of members and frictionally engaged with one of such members for normal rotative movement therewith, spaced abutments on said third member, a part on the second of said pair of members cooperating with said abutments for positively limiting movement of said third member relative to said second member, said part alternatively engaging either of said abutments in dependence upon the direction of relative rotation of said pair of members, and means effective to indicate the difference in relative rotation of said elements in accordance with the relative positions of said second and third members.

3. In a mechanism for ascertaining the need for a control operation in respect to two independently rotatable elements to maintain the relative speed thereof within a predetermined range of variation, the combination of a pair of relatively rotatable members adapted to be separately driven one by each of said elements in such a ratio that said members rotate substantially in synchronism when said predetermined speed relation exists, and means associated with said members operable to analyze such lack of synchronism thereof and detect which of the actuating elements is inducing such lack of synchronism, including a device normally actuated by one of said members, means for enabling the other of said members to limit such actuation of said device when said other member is rotating more slowly than said one member and effective when said other member is rotating more rapidly than said one member to enable said other member to assist said one member in actuating said device, and indicating means controlled by said device and adjustable to alternative relations in dependence upon whether said device is thus limited or assisted in its actuation by said one member.

4. In a mechanism for determining the need for a control operation in respect to two relatively movable elements to maintain a predetermined relative speed thereof within a predetermined range of variation, the combination of a pair of relatively rotatable members adapted to be separately driven one by each of said elements in such a ratio that said members rotate substantially in synchronism when said predetermined speed relation exists, means associated with said rotatable members to detect lack of synchronism thereof, direction determining means operable by one of said members to determine which direction the actuating elements are moving, and means governed in part by said direction determining means and operable to detect which of said actuating elements is inducing such lack of synchronism.

5. In a device for detecting the need for a control operation with respect to two relatively movable elements to maintain substantially a predetermined speed relation between said elements, the combination of a first switch means adapted for actuation by said elements and operable to detect variation from said predetermined speed relation, a second switch means having open and closed positions and associated with said first switch means for actuation by said elements, and means operable upon said second switch means to open said second switch when a particular one of said elements is moving faster, and to close said second switch means when the other of said elements is moving faster, and including a rotatable device normally actuated by one of said elements and alternatively limited or assisted in such actuation by the other of said elements in dependence upon the sense of relative movement of said elements for thereby alternatively adjusting said second switch means to its open or closed relation.

6. In a device for detecting the need for a control operation with respect to two relatively moving elements, to maintain substantially a predetermined speed relation between said elements, the combination of a pair of relatively rotatable members adapted to be driven one from each of the movable elements, a first switch means including at least two poles on one of said members and a switch member on the other of said members adapted to contact said poles successively during relative rotation of said members, a final control circuit including a final control switch and branch leads governed by a relay actuated selector switch, electrically operated means connected to said poles and said switch member operable when the time interval between successive contacts with said poles is less than a predetermined amount to close said final control switch, an automatic switch associated with said members and arranged for movement to closed position when a particular one of said members is rotating faster, and an energizing circuit from said automatic switch to the relay of said selector switch.

7. In a device for detecting the need for a control operation with respect to two relatively movable elements to maintain substantially a predetermined speed relation between said elements, the combination of means adapted for actuation by said elements and operable to detect variation from said predetermined speed relation, switch means having open and closed positions and adapted for actuation from said movable elements, and means operable upon said switch means to open said switch when a particular one of said elements is moving faster, and to close said switch means when the other of said elements is moving faster, and including a rotatable device normally actuated by one of said elements and alternatively limited or assisted in such actuation by the other of said elements in dependence upon the sense of relative movement of said elements for thereby alternatively adjusting said switch means to its open or closed relation.

8. In a device for detecting the need for a control operation with respect to two relatively movable elements, to maintain substantially a predetermined speed relation between said elements, the combination of a pair of relatively rotatable members adapted to be driven one from each of the movable elements, a first switch means including at least two poles on one of said members and a switch member on the other of said members adapted to contact said poles successively during relative rotation of said members, a final control circuit including a final control switch and branch leads governed by a relay actuated selector switch, a reversing switch between said branch leads electrically operated means connected to said poles and said switch member operable when the time interval between successive contacts with said poles is less than a predetermined amount to close said final control switch, an automatic switch associated with said members and arranged for movement to closed position when a particular one of said members is rotating faster, an energizing circuit from said automatic switch to the relay of said selector switch, and means responsive to the direction of rotation of one of said members for governing said reversing switch.

9. In a device for determining the need for a control operation in respect to two movable elements to maintain a predetermined relative speed thereof within a predetermined range of variation, the combination of at least two relatively rotatable members, means adapted to be governed by movement of said elements whereby relative rotation of said members is induced in proportion to the variation of said relative speed from said predetermined value, cooperating means associated in part with each of said relatively rotatable members and operable as an incident to such relative rotation of said members to produce a series of primary control actuations the frequency of which varies in a predetermined relation to the variation from said predetermined relative speed of said elements, a control switch, means responsive to a particular frequency of said primary control actuations to operate said control switch, a control circuit governed by said control switch and including branch leads, selecting means operable as an incident to the operation of said relatively rotatable members to detect which of said elements is inducing the undesired variation, a selector switch governing said branch leads, and means controlled by said selector means for actuating said selector switch.

10. In combination with a pair of movable elements each having individually governable control means, apparatus operable by said movable elements to compare their speeds of movement and detect undesired variations in their relative speeds of movement, a device normally actuated by one of said elements but limited in such actuation by the other of such elements when said other element is moving more slowly than said one element, and aided in such actuation when said other element is moving more rapidly than said one element, selecting means responsive to said device and effective in accordance with whether said device is being aided or limited in its actuation to determine to which of said elements a corrective must be applied to offset said undesired speed variation, and means under the joint control of said detecting means and said selecting means to govern said control means and cause the required corrective to be applied to the selected one of said elements.

11. In combination with a pair of movable elements each having individually governable control means, apparatus operable by said movable elements to compare their speeds of movement and detect undesired variations in their relative speeds of movement, a device normally actuated by one of said elements but limited in such actuation by the other of such elements when said other element is moving more slowly than said one element, and aided in such actuation when said other element is moving more rapidly than said one element, selecting means responsive to said device and effective in accordance with whether said device is being aided or limited in its actuation to determine to which of said elements a corrective must be applied to offset said undesired speed variation, and means under the joint control of said detecting means, said selecting means and the direction of movement of said elements to govern said control means and cause the required corrective to be applied.

12. In combination with a pair of movable elements normally adapted for movement in a particular direction and each having individually governable control means, apparatus operable by said movable elements to compare their speeds of movement and detect undesired variations in their relative speeds of movement, a device normally actuated by one of said elements but limited in such actuation by the other of such elements when said other element is moving more slowly than said one element, and adided in such actuation when said other element is moving more rapidly than said one element, selecting means responsive to said device and effective in accordance with whether said device is being aided or limited in its actuation to determine to which of said elements a corrective must be applied to offset said undesired speed variation, means under the joint control of said detecting means and said selecting means to govern said control means and cause the required corrective to be applied, and means operable in response to reversal of the direction of movement of said elements from said normal direction to cause the action of said selecting means to be correspondingly reversed.

13. In an apparatus which includes means for reducing individually the retarding effect of the braking means upon any selected one of at least two relatively rotatable wheels of railway equipment or the like, the combination of means operable to compare the rotative speeds of such wheels and detect relative reduction in the speed of any one of such wheels, means including a device normally actuated by one of said wheels but retarded in such actuation by the other of said wheels when said other wheel is rotating more slowly than said one wheel, and aided in such actuation when said other wheel is rotating more rapidly than said one wheel, and operable in response to whether said device is being thus retarded or aided in its normal actuation to determine which one of said wheels is undergoing the detected relative reduction in speed, and means operable under the joint control of said detecting means and said determining means to reduce the retarding effect of said braking means on the determined wheel.

14. In an apparatus which includes at least two relatively rotatable railway wheels or the like, and slide preventing means operable individually with respect to each of such wheels to offset with respect to its individual wheel any tendency of such individual wheel to slide, the combination of means operable to compare the speeds of said wheels and detect any objectionable tendency of any of such wheels to slide, means including a device normally actuated by one of said wheels but retarded in such actuation by the other of said wheels when said other wheel is rotating more slowly than said one wheel, and aided in such actuation when said other wheel is rotating more rapidly than said one wheel, and operable in response to whether said device is being thus retarded or aided in its normal actuation to determine which of said wheels is indicating the detected tendency to slide, and means operable under the joint control of said detecting means and said determining means to operate the slide preventing means pertaining to the determined wheel.

15. In combination with a pair of relatively rotatable car wheels having individual braking means normally applied in unison and having additional individual control valves operable to effect individual control of the braking means of the individual wheels, means operable in accordance with the rotative speeds of said wheels to compare their speeds and detect variations in their relative speed of movement, a rotatable member frictionally driven by one of said wheels, means operatively connected with the other of said wheels for retarding or increasing the rotative speed of said member with respect to its free normal speed in accordance with whether said other wheel is rotating at a respectively lower or higher speed than said one wheel, selecting means responsive to said member and effective in dependence upon whether said member is being retarded or speeded up relative to said one wheel to assume a selected operative relation, and means under the joint control of said detecting means and said selecting means to operate the individual control valve of the selected wheel.

16. An apparatus for controlling the braking of railway equipment to prevent sliding of the wheels of such equipment, said apparatus comprising, in combination, a pair of relatively rotatable car wheels, individual braking means for such wheels, control means for braking means including means for governing the braking means of the two wheels in unison or individually, means operatively associated with said two wheels and operable to detect variation in the relative speed of said wheels during the application of said braking means to said wheels, a rotatable member frictionally driven by one of said wheels, means operatively connected with the other of said wheels for retarding or increasing the rotative speed of said member with respect to its free normal speed in accordance with whether said other wheel is rotating at a respectively lower or higher speed than said one wheel, means operable in responsive to whether said member is retarded or speeded up in its rotation relative to said one wheel to detect which of said wheels is rotating the slower, selecting means operable when the detected variation in relative speed of said wheels exceeds a predetermined amount to actuate the individual control means of the braking means of the wheel which is moving slower to release the individual braking means of said last mentioned wheel, and means governed by the direction of rotation of said wheels operable to govern the action of said selecting means and correlate the same with the direction of rotation of said wheels.

17. In an apparatus which includes at least two relatively rotatable railway wheels or the like, and slide preventing means operable individually with respect to each of such wheels to offset with respect to its individual wheel any tendency of such individual wheel to slide, the combination of means operable to compare the speeds of said wheels and detect any objectionable tendency of any of such wheels to slide, a rotatable member frictionally driven by one of said wheels, means operatively connected with the other of said wheels for retarding or increasing the rotative speed of said member with respect to its free normal speed in accordance with whether said other wheel is rotating at a respectively lower or higher speed than said one wheel, means operable in response to whether said member is retarded or speeded up in its rotation relative to said one wheel to determine which of said wheels is indicating the detected tendency to slide, means operable under the joint control of said detecting means and said determining means to operate the slide preventing means pertaining to the determined wheel, and means operable automatically to correlate said determining means with the direction of rotation of said wheels.

18. In a device for detecting the need for a control operation in respect of a pair of relatively rotatable elements in order to maintain the relative speed thereof within a predetermined range of variation, the combination of a pair of commutators each having a rotor adapted to be secured to one of said elements for rotation therewith, a commutator housing for each of said commutators adapted to be stationarily mounted about their respective rotors, said housings having correspondingly formed commutator surfaces with corresponding commutator bars of the two housings electrically connected, brush means associated with each of said rotors for contacting their respective commutator surfaces, and electrically actuated control means in circuit with the brush means of said two commutators and adapted to be energized when the brush means of the two commutators contact two electrically connected commutator bars of the two commutators.

19. A device for detecting the need for a control operation in respect of a pair of relatively rotatable elements in order to maintain the relative speed thereof within a predetermined range of variation, said device comprising electric circuit closing means adapted to be associated with two such relatively rotatable elements with the relatively movable parts of said circuit closing means located remotely with respect to each other, circuits electrically connected to and closable by said electric circuit closing means for enabling the relatively movable parts of said circuit closing means to be operatively related to thereby detect relative rotation between the two elements with which it is associated, and electrically operable control means included in said circuits and operable under the control of said electric circuit closing means.

20. In a device for detecting the need for a control operation in respect of a pair of relatively movable elements in order to maintain the relative speed thereof within a predetermined range of variation, the combination of a pair of commutators each having a rotor adapted to be driven by one of said elements, a commutator housing for each of said commutators adapted to be stationarily mounted about their respective rotors, said housings having correspondingly formed commutator surfaces with corresponding commutator bars of the two housings electrically connected, brush means associated with each of said rotors for contacting their respective commutator surfaces, and electrically actuated control means in circuit with the brush means of said two commutators and adapted to be energized when the brush means of the two commutators contact two electrically connected commutator bars of the two commutators.

21. A device for detecting the need for a control operation in respect of at least two relatively movable elements in order to maintain the relative speed thereof within a predetermined range of variation, said device comprising electric circuit closing means including at least two movable members each adapted to be driven by one of said elements and having said movable members located remotely with respect to each other, circuits electrically connected to and closable by said electric circuit closing means for enabling the relatively movable parts of said circuit closing means to be operatively related to thereby detect relative rotation between the elements with which it is associated, and electrically operable control means included in said circuits and operable under the cotnrol of said electric circuit closing means.

22. In a device for detecting the need for a control operation in respect of a pair of relatively rotatable elements in order to maintain the relative speed thereof within a predetermined range of variation, a pair of commutators adapted for operative connection one with each of two such relatively rotatable elements, circuits connecting corresponding commutator bars of said commutators, brushes for said commutators, and electrically operable control means in circuit with said brushes.

23. In a device for detecting the need for a control operation in respect of a pair of relatively movable elements in order to maintain the relative speed thereof within a predetermined range of variation, a pair of commutators adapted for operative connection one with each of two such relatively rotatable elements to be driven thereby, circuits connecting corresponding commutator bars of said commutators, brushes for said commutators, and electrically operable control means in circuit with said brushes, at least one of said brushes being formed to contact a group of its commutator bars constituting a substantial angular portion of its commutator surface.

24. In a device for detecting a difference in the relative movement of two relatively movable elements, the combination of a pair of rotatable members, means respectively connecting said members to said elements and operable to rotate said members in the same direction with respect to each other and at speeds respectively proportionate to the operative speeds of said elements, a third member yieldingly connected to one of said members to normally rotate therewith and capable of movement relative to the other of said members, means for limiting the movement of the third member relative to said other member whereby the third member is disposed in alternative positions in dependence upon the direction of relative rotation between said pair of members, and means responsive to said third member when it occupies either of said alternative positions with respect to said second member for indicating the difference in relative rotation of said elements.

ROSSER L. WILSON.